US012744712B2

(12) United States Patent
Han et al.

(10) Patent No.: US 12,744,712 B2
(45) Date of Patent: Sep. 22, 2026

(54) MODEL TRAINING METHOD AND APPARATUS, SYSTEM, PREDICTION METHOD, AND COMPUTER READABLE STORAGE MEDIUM

(71) Applicant: ZTE Corporation, Shenzhen (CN)

(72) Inventors: Bingtao Han, Shenzhen (CN); Jianwei Wang, Shenzhen (CN); Zongying Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1215 days.

(21) Appl. No.: 17/625,767

(22) PCT Filed: Aug. 12, 2020

(86) PCT No.: PCT/CN2020/108675

§ 371 (c)(1),
(2) Date: Jan. 9, 2022

(87) PCT Pub. No.: WO2021/027844

PCT Pub. Date: Feb. 18, 2021

(65) Prior Publication Data

US 2022/0253678 A1 Aug. 11, 2022

(30) Foreign Application Priority Data

Aug. 13, 2019 (CN) ......................... 201910744658.6

(51) Int. Cl.
*H04L 41/14* (2022.01)
*G06N 3/045* (2023.01)
(Continued)

(52) U.S. Cl.
CPC ........... *H04L 41/145* (2013.01); *G06N 3/045* (2023.01); *G06N 3/048* (2023.01); *G06N 3/08* (2013.01);
(Continued)

(58) Field of Classification Search
None
See application file for complete search history.

(56) References Cited

U.S. PATENT DOCUMENTS

2018/0373988 A1* 12/2018 Dhanyamraju ....... G06F 16/986
2019/0227980 A1* 7/2019 McMahan ............... H04L 63/00
(Continued)

FOREIGN PATENT DOCUMENTS

CN 107229966 A 10/2017
CN 109146097 A 1/2019
(Continued)

OTHER PUBLICATIONS

"Exploring Federated Learning on Battery-powered Devices", https://dl.acm.org/doi/pdf/10.1145/3321408.3323080, Xu et al., 2019.*
(Continued)

*Primary Examiner* — Haimei Jiang
(74) *Attorney, Agent, or Firm* — Vivacqua Crane, PLLC

(57) ABSTRACT

A model training method and apparatus, a system, a prediction method, an apparatus, and a non-transitory computer-readable storage medium are disclosed. The model training method may include: determining, by a first device, a second device participating in model training, and sending a part of or the overall model training operation to the second device (100); and executing, by the first device, a first model training code to, for a jth training step, deliver by the first device a model parameter corresponding to the jth training step to the second device in response to the model training being not finished; and receiving a model parameter increment corresponding to the jth training step uploaded by the second device, and calculating a model parameter corresponding to a (j+1)th training step according to the model parameter increment corresponding to the jth training step uploaded by the second device (101).

18 Claims, 6 Drawing Sheets

100

A first device determines, according to a description of data required for model training in a model training operation, a second device participating in model training, and sends a part of or the overall model training operation to the second device

101

The first device executes a first model training code in the model training operation to, for a jth training step, deliver by the first device a model parameter corresponding to the jth training step to the second device in response to the model training being not finished; and receive a model parameter increment corresponding to the jth training step uploaded by the second device, and calculate a model parameter corresponding to a (j+1)th training step according to the model parameter increment corresponding to the jth training step uploaded by the second device

(51) Int. Cl.

| | |
|---|---|
| ***G06N 3/048*** | (2023.01) |
| ***G06N 3/08*** | (2023.01) |
| ***H04L 41/147*** | (2022.01) |
| ***H04L 41/149*** | (2022.01) |

(52) U.S. Cl.

CPC .......... *H04L 41/147* (2013.01); *H04L 41/149* (2022.05)

(56) References Cited

U.S. PATENT DOCUMENTS

| | | | | |
|---|---|---|---|---|
| 2019/0385043 | A1* | 12/2019 | Choudhary | G06F 13/4239 |
| 2022/0122174 | A1* | 4/2022 | Huang | G06N 20/00 |

FOREIGN PATENT DOCUMENTS

| | | | |
|---|---|---|---|
| CN | 109656529 | A | 4/2019 |
| CN | 109993299 | A | 7/2019 |
| CN | 111190487 | A | 5/2020 |

OTHER PUBLICATIONS

International Searching Authority. International Search Report and Written Opinion for PCT Application No. PCT/CN2020/108675 and English translation, mailed Nov. 18, 2020, pp. 1-12.

European Patent Office. Extended European Search Report for EP Application No. 20851550.2, mailed Dec. 9, 2022, pp. 1-9.

Nishio, et al. “Client Selection for Federated Learning with Heterogeneous Resources in Mobile Edge,” IEEE International Conference on Communications, May 2019, pp. 1-7.

Xu, et al. “Exploring Federated Learning on Battery-powered Devices,” Association for Computing Machinery TURC, May 2019, pp. 1-6.

The State Intellectual Property Office of People’s Republic of China. First Office Action for CN Application No. 201910744658.6 and English translation, mailed Jan. 7, 2025, pp. 1-12.

The State Intellectual Property Office of People’s Republic of China. First Search Report for CN Application No. 201910744658.6 and English translation, mailed Jan. 2, 2025, pp. 1-12.

* cited by examiner

Figure 1:
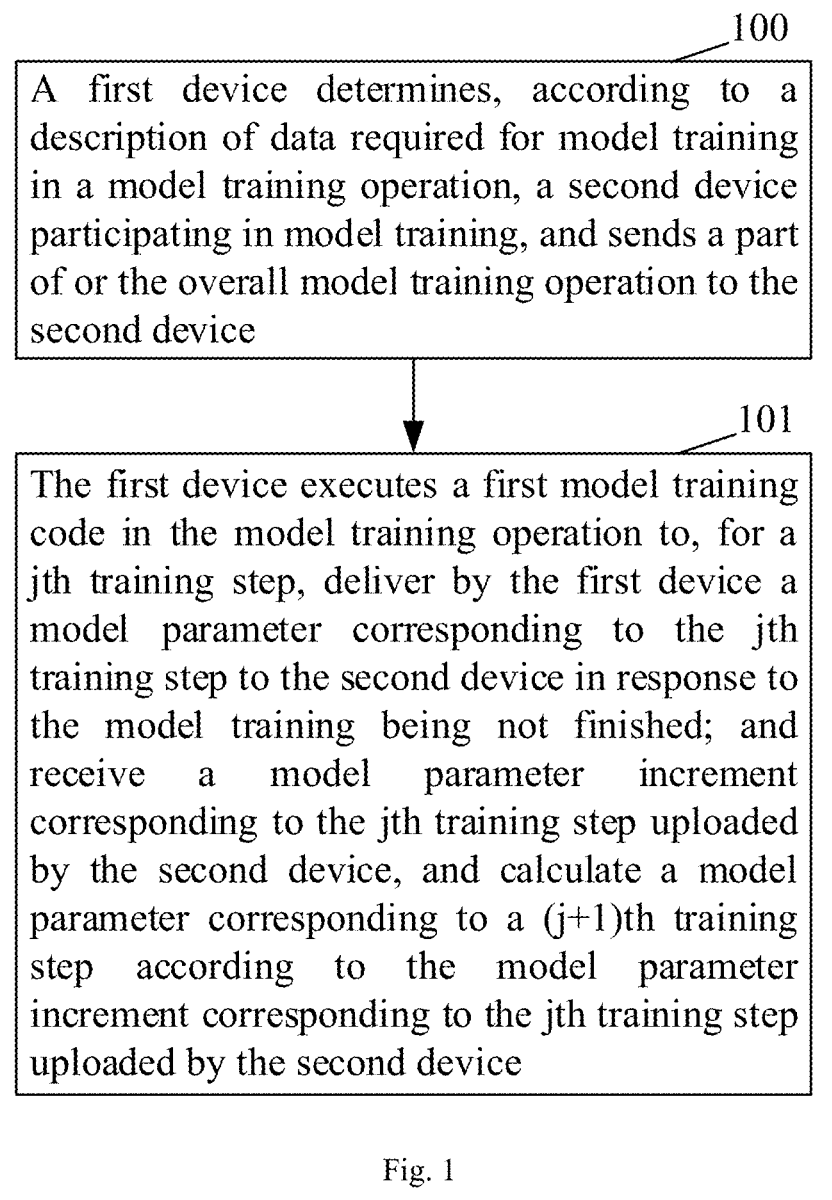

100

A first device determines, according to a description of data required for model training in a model training operation, a second device participating in model training, and sends a part of or the overall model training operation to the second device

101

The first device executes a first model training code in the model training operation to, for a jth training step, deliver by the first device a model parameter corresponding to the jth training step to the second device in response to the model training being not finished; and receive a model parameter increment corresponding to the jth training step uploaded by the second device, and calculate a model parameter corresponding to a (j+1)th training step according to the model parameter increment corresponding to the jth training step uploaded by the second device

A second device receives a part of or an overall model training operation sent by a first device

201

For a jth training step, the second device receives a model parameter corresponding to a jth training step delivered by the first device, performs model training according to the model parameter corresponding to the jth training step and the part of or the overall model training operation to obtain a model parameter increment corresponding to the jth training step, and uploads the model parameter increment corresponding to the jth training step to the first device

Fig. 2

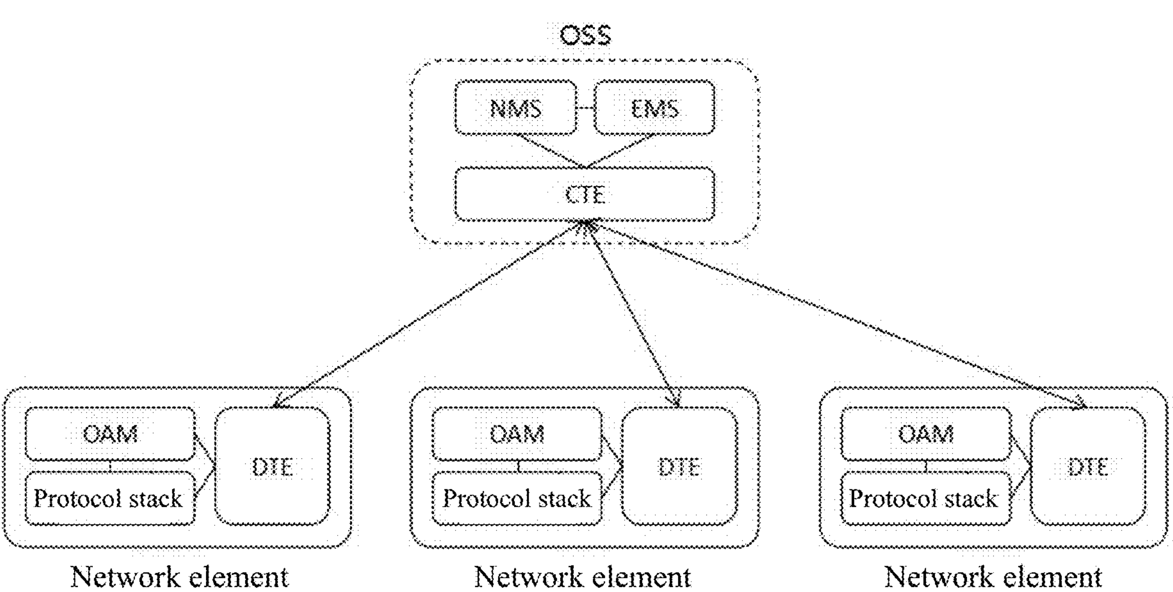

Fig. 3

MODEL TRAINING METHOD AND APPARATUS, SYSTEM, PREDICTION METHOD, AND COMPUTER READABLE STORAGE MEDIUM

CROSS-REFERENCE TO RELATED APPLICATION

This application is a national stage filing under 35 U.S.C. § 371 of international application number PCT/CN2020/108675, filed on Aug. 12, 2020, which claims priority to Chinese patent application No. 201910744658.6 filed on Aug. 13, 2019. The contents of these applications are incorporated herein by reference in their entirety.

TECHNICAL FIELD

Embodiments of the present disclosure relate to, but are not limited to, the field of artificial intelligence and telecom networks, and in particular to a model training method, apparatus, system, a prediction method, and a non-transitory computer-readable storage medium.

BACKGROUND

Traditionally, the network intelligence system collaborates in a way that an operation support system (OSS) collects data from each network element, centralizes data processing and model training on the OSS, and delivers the trained model to each network element to perform inference. However, there are several problems with this approach. Firstly, the data generated by network elements are diverse, and there is no uniform data from the network element devices of different device manufacturers, and some data device manufacturers are not open, which makes it difficult to collect and process data centrally. Secondly, the amount of data generated by network elements is huge, and collecting data will occupy a large amount of backhaul bandwidth, which increases the cost of network deployment. Finally, centralized data collection may bring the risk of user privacy leakage to third parties, which increases the difficulty of data security management. In other words, in some application scenarios (e.g., when a device manufacturer does not open data), model training is not possible, and collecting data required for the model training will take up a large amount of bandwidth and make data security management more difficult.

SUMMARY

Embodiments of the present disclosure provide a model training method and a corresponding apparatus, system, and non-transitory computer-readable storage medium, and a prediction method and a corresponding apparatus and non-transitory computer-readable storage medium.

An embodiment of the present disclosure provides a model training method, which may include: determining, by a first device according to a description of data required for model training in a model training operation, a second device participating in model training, and sending a part of or the overall model training operation to the second device; executing, by the first device, a first model training code in the model training operation to, for a jth training step, deliver by the first device a model parameter corresponding to the jth training step to the second device in response to the model training being not finished; and receive a model parameter increment corresponding to the jth training step uploaded by the second device, and calculate a model parameter corresponding to a (j+1)th training step according to the model parameter increment corresponding to the jth training step uploaded by the second device.

An embodiment of the present disclosure provides a model training method, which may include: receiving, by a second device, a part of or an overall model training operation sent by a first device; and for a jth training step, receiving by the second device a model parameter corresponding to a jth training step delivered by the first device, performing model training according to the model parameter corresponding to the jth training step and the part of or the overall model training operation to obtain a model parameter increment corresponding to the jth training step, and uploading the model parameter increment corresponding to the jth training step to the first device.

An embodiment of the present disclosure provides a model training apparatus, which may include a processor and a non-transitory computer-readable storage medium, where the non-transitory computer-readable storage medium stores instructions which, when executed by the processor, cause the processor to perform any one of the above model training methods.

An embodiment of the present disclosure provides a non-transitory computer-readable storage medium storing a computer program which, when executed by a processor, causes the processor to perform any one of the above model training methods.

An embodiment of the present disclosure provides a model training apparatus, which may include: a model training operation delivering module configured to determine, according to a description of data required for model training in a model training operation, a second device participating in model training, and send a part of or the overall model training operation to the second device; and a first model training module configured to execute a first model training code in the model training operation to, for a jth training step, deliver by the first device a model parameter corresponding to the jth training step to the second device in response to the model training being not finished; and receive a model parameter increment corresponding to the jth training step uploaded by the second device, and calculate a model parameter corresponding to a (j+1)th training step according to the model parameter increment corresponding to the jth training step uploaded by the second device.

An embodiment of the present disclosure provides a model training apparatus, which may include: a model training operation receiving module configured to receive a part of or an overall model training operation sent by a first device; and a second model training module configured to, for a jth training step, receive a model parameter corresponding to a jth training step delivered by the first device, perform model training according to the model parameter corresponding to the jth training step and the part of or the overall model training operation to obtain a model parameter increment corresponding to the jth training step, and upload the model parameter increment corresponding to the jth training step to the first device.

An embodiment of the present disclosure provides a model training system, which may include: a first device configured to determine, according to a description of data required for model training in a model training operation, a second device participating in model training, and send a part of or the overall model training operation to the second device; execute a first model training code in the model training operation to, for a jth training step, deliver a model parameter corresponding to the jth training step to the second device in response to the model training being not finished; and receive a model parameter increment corresponding to the jth training step uploaded by the second device, and calculate a model parameter corresponding to a (j+1)th training step according to the model parameter increment corresponding to the jth training step uploaded by the second device; and a second device configured to receive the part of or the overall model training operation sent by the first device; and for a jth training step, receive the model parameter corresponding to the jth training step delivered by the first device, perform model training according to the model parameter corresponding to the jth training step and the part of or the overall model training operation to obtain a model parameter increment corresponding to the jth training step, and upload the model parameter increment corresponding to the jth training step to the first device.

An embodiment of the present disclosure provides a prediction method, which may include: acquiring data required for prediction, and extracting a key feature from the data required for prediction; and inputting the key feature into a model corresponding to a trained model parameter in any one of the above model training methods, and outputting a predicted value.

An embodiment of the present disclosure provides a prediction apparatus, which may include a processor and a non-transitory computer-readable storage medium, where the non-transitory computer-readable storage medium stores instructions which, when executed by the processor, cause the processor to perform any one of the above prediction methods.

An embodiment of the present disclosure provides a non-transitory computer-readable storage medium storing a computer program which, when executed by a processor, causes the processor to perform any one of the above prediction methods.

An embodiment of the present disclosure provides a prediction apparatus, which may include: a data acquisition module configured to acquire data required for prediction; a key feature extraction module configured to extract a key feature from the data required for prediction; and a prediction module configured to input the key feature into a model corresponding to a trained model parameter in any one of the above model training methods, and output a predicted value.

Additional features and advantages of the embodiments of the present disclosure will be set forth in the subsequent description, and in part will become apparent from the description, or may be learned by practice of the embodiments of the present disclosure. The purposes and other advantages of the embodiments of the present disclosure can be realized and obtained by structures particularly noted in the description, the appended claims and the accompanying drawings.

BRIEF DESCRIPTION OF DRAWINGS

The accompanying drawings are used to provide a further understanding of the technical schemes of the embodiments of the present disclosure and constitute a part of the description. The accompanying drawings are used to explain the technical schemes of the embodiments of the present disclosure together with the embodiments of the present disclosure, and do not constitute a restriction on the technical schemes of the embodiments of the present disclosure.

FIG. 1 is a flowchart of a model training method according to an embodiment of the present disclosure;

FIG. 2 is a flowchart of a model training method according to another embodiment of the present disclosure;

FIG. 3 is a schematic diagram of CTE and DTE installation and deployment according to an embodiment of the present disclosure;

DETAILED DESCRIPTION

Figure 4:
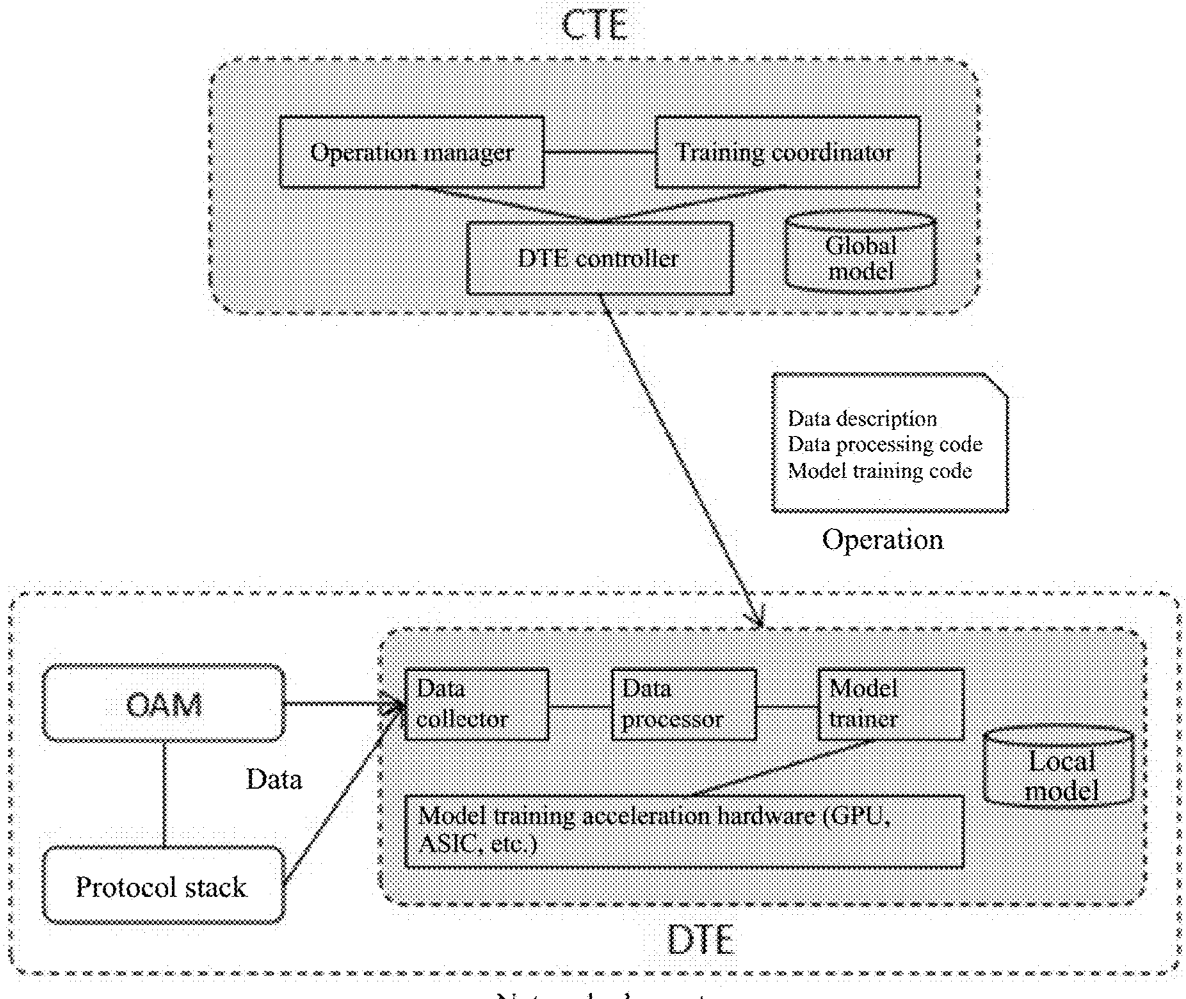
FIG. 4 is an internal architecture diagram of a CTE and a DTE according to an embodiment of the present disclosure.

The embodiments of the present disclosure will be described in detail below in combination with the accompanying drawings. It should be noted that any combinations of embodiments and features of the embodiments of the present disclosure without conflict are possible.

The steps shown in the flowcharts of the drawings may be performed in a computer system, such as with a set of computer-executable instructions. Moreover, although a logical order is shown in the flowcharts, the steps shown or described may be performed, in some cases, in a different order than shown or described herein.

With reference to FIG. 1, an embodiment of the present disclosure proposes a model training method, including the following steps.

At step 100, a first device determines, according to a description of data required for model training in a model training operation, a second device participating in model training, and sends a part of or the overall model training operation to the second device.

In an embodiment of the present disclosure, the model training operation includes: the description of data required for model training, a data processing code, the first model training code, and a second model training code.

The models in the embodiments of the present disclosure may be any type of model, such as artificial intelligence (AI) models (AI Models), deep learning models, machine learning models, etc.

In an embodiment of the present disclosure, the model training operation may be pre-set in the first device or may be deployed by the user on the first device, that is, the user inputs the model training operation and the first device receives the model training operation input by the user.

In an embodiment of the present disclosure, the model training operation may be carried in a start model training message (e.g., a deploy_training_job message) so as to be sent.

In an embodiment of the present disclosure, for example, in response to the description of data required for model training including a list of cell IDs, the second device participating in the model training is second devices corresponding to all base stations covered by all cells in the list of cell IDs; and in response to the description of data required for model training including a list of device (e.g., Packet Transport Network (PTN) device) IDs, the second device participating in the model training is second devices corresponding to all devices in the list device IDs.

At step 101, the first device executes a first model training code in the model training operation to, for a jth training step, deliver by the first device a model parameter corresponding to the jth training step to the second device in response to the model training being not finished; and receive a model parameter increment corresponding to the jth training step uploaded by the second device, and calculate a model parameter corresponding to a (j+1)th training step according to the model parameter increment corresponding to the jth training step uploaded by the second device.

In an embodiment of the present disclosure, the first device may send a start training step message (such as a start_training_step message) to the second device, where the start training step message may carry the model parameter corresponding to the jth training step, and may also carry the reference number of the jth training step, while the reference number of the jth training step is not necessary.

In an example, the model parameter corresponding to the jth training step may be represented in the form of a vector W, i.e., the model parameter vector W corresponding to the jth training step. Of course, it may also be represented without the vector form, and embodiments of the present disclosure do not limit the specific representation of the model parameter.

Similarly, the model parameter increment corresponding to the jth training step may also be represented in the form of a vector. Of course, it may also be represented without the vector form, and embodiments of the present disclosure do not limit the specific representation of the model parameter increment.

In an embodiment of the present disclosure, the first device may receive a training step finished message (e.g., a training_step_finished message) sent by an ith second device, and the training step finished message carries the model parameter increment corresponding to the jth training step. The training step finished message further carries any one or more of the following: the number of training data used in the jth training step, the loss function value corresponding to the jth training step, and other contents specified in the model training code that need to be uploaded.

In an embodiment of the present disclosure, calculating the model parameter corresponding to the (j+1)th training step according to the model parameter increment corresponding to the jth training step uploaded by the second device includes:

- calculating a global model parameter increment corresponding to the jth training step according to the model parameter increment corresponding to the jth training step uploaded by the second device;
- calculating the model parameter corresponding to the (j+1)th training step according to the global model parameter increment corresponding to the jth training step.

In an embodiment of the present disclosure, the global model parameter increment corresponding to the jth training step may be calculated in a variety of ways. In an example, before calculating the global model parameter increment corresponding to the jth training step according to the model parameter increment corresponding to the jth training step uploaded by the second device, the method further includes: receiving, by the first device, the number of training data used in the jth training step uploaded by the second device.

In an embodiment of the present disclosure, the step of calculating the global model parameter increment corresponding to the jth training step according to the model parameter increment corresponding to the jth training step uploaded by the second device includes: calculating the global model parameter increment corresponding to the jth training step in accordance with formula $$\Delta\overline{W}_j = \frac{1}{Z_j}\sum_{i}^{N} \#D_{ij}\Delta W_{ij},$$

where $\Delta\overline{W}_j$ is the global model parameter increment corresponding to the jth training step, $$Z_j = \sum_{i}^{N} \#D_{ij},$$

$\#D_{ij}$ is the number of training data corresponding to the jth training step uploaded by an ith second device, N is the number of second devices participating in the model training, and $\Delta W_{ij}$ is the model parameter increment corresponding to the jth training step uploaded by the ith second device.

In an embodiment of the present disclosure, the model parameter corresponding to the (j+1)th training step may be calculated in a variety of methods. In an example, calculating the model parameter corresponding to the (j+1)th training step according to the global model parameter increment corresponding to the jth training step includes: calculating the model parameter corresponding to the (j+1)th training step in accordance with formula $W_{j+1}=W_j+\alpha\Delta\overline{W}_j$, where Wj+1 is the model parameter corresponding to the (j+1)th training step, Wj is the model parameter corresponding to the jth training step, $\alpha$ is a learning rate, which is a constant, and $\Delta\overline{W}_j$ is the global model parameter increment corresponding to the jth training step.

In another embodiment of the present disclosure, in response to the model training being finished, the method further includes any one or both of the following:

- sending, by the first device, a stop model training message (such as a delete_training_job message) to the second device;
- not delivering, by the first device, the model parameter corresponding to the jth training step to the second device.

In an embodiment of the present disclosure, a variety of methods may be used to determine whether the model training is finished, and these methods may be implemented in the first model training code in the model training operation.

In an example, determining whether the model training is finished includes any one or both of the following:

- in response to j being greater than or equal to a maximum number of training steps, determining that the model training is finished;
- in response to j being less than the maximum number of training steps, determining that the model training is not finished.

The maximum number of training steps may be specified by the user when deploying the model training operation.

In another example, determining whether the model training is finished includes any one or both of the following:

in response to a difference between average loss function values corresponding to any two adjacent training steps from a (j−m+1)th training step to the jth training step being less than or equal to a preset threshold, determining that the model training is finished;

in response to a difference between average loss function values corresponding to at least two adjacent training steps from the (j−m+1)th training step to the jth training step being greater than the preset threshold, determining that the model training is not finished.

In other words, in response to the average loss function value not changing significantly in m consecutive training steps, the model training is considered to be completed.

In an example, an average loss function value corresponding to the jth training step is calculated in accordance with formula $$\overline{L_j} = \frac{1}{Z_j}\sum_{i}^{N} \#D_{ij}L_{ij},$$

where $\overline{L}_j$ is an average loss function value corresponding to the jth training step, $$Z_j = \sum_{i}^{N} \#D_{ij},$$

$\#D_{ij}$ is the number of training data corresponding to the jth training step uploaded by an ith second device, N is the number of second devices participating in the model training, and $L_{ij}$ is a loss function value corresponding to the jth training step uploaded by the ith device.

With reference to FIG. 2, another embodiment of the present disclosure proposes a model training method, including the following steps.

At step 200, a second device receives a part of or an overall model training operation sent by a first device.

In an embodiment of the present disclosure, the second device may receive a start model training message (e.g., a deploy_training_job message) sent by the first device to acquire the part of or the overall model training operation from the model training message.

In an embodiment of the present disclosure, the model training operation includes: a description of data required for model training, a data processing code, a first model training code, and a second model training code.

In an embodiment of the present disclosure, the second device may start the model training operation after receiving the part of or the overall model training operation sent by the first device.

At step 201, for a jth training step, the second device receives a model parameter corresponding to a jth training step delivered by the first device, performs model training according to the model parameter corresponding to the jth training step and the part of or the overall model training operation to obtain a model parameter increment corresponding to the jth training step, and uploads the model parameter increment corresponding to the jth training step to the first device.

In an embodiment of the present disclosure, the second device may receive a start training step message (such as a start_training_step message) sent by the first device, where the start training step message may carry the model parameter corresponding to the jth training step, and may also carry the reference number of the jth training step, while the reference number of the jth training step is not necessary.

In an example, the model parameter corresponding to the jth training step may be represented in the form of a vector W, i.e., the model parameter vector W corresponding to the jth training step. Of course, it may also be represented without the vector form, and embodiments of the present disclosure do not limit the specific representation of the model parameter.

Similarly, the model parameter increment corresponding to the jth training step may also be represented in the form of a vector. Of course, it may also be represented without the vector form, and embodiments of the present disclosure do not limit the specific representation of the model parameter increment.

In an example, performing the model training according to the model parameter corresponding to the jth training step and the part of or the overall model training operation to obtain the model parameter increment corresponding to the jth training step includes: executing the data processing code to acquire from a network element corresponding to itself training data corresponding to the jth training step according to the description of data required for model training and process the training data corresponding to the jth training step to obtain training samples corresponding to the jth training step, and executing the second model training code to perform the model training according to the model parameter corresponding to the jth training step and the training samples corresponding to the jth training step to obtain the model parameter increment corresponding to the jth training step.

In another example, after the second device receives the part of or the overall model training operation sent by the first device, the method further includes: executing the data processing code to acquire from a network element corresponding to itself training data according to the description of data required for model training and process the training data to obtain training samples.

In an embodiment of the present disclosure, the step of performing the model training according to the model parameter corresponding to the jth training step and the part of or the overall model training operation to obtain the model parameter increment corresponding to the jth training step includes: executing the second model training code to perform the model training according to the model parameter corresponding to the jth training step and the training samples to obtain the model parameter increment corresponding to the jth training step.

That is to say, the training data corresponding to different training steps may be the same or different, that is, the training data corresponding to different training steps may be acquired at one time after the part of or the overall model training operation is received, or different training data may be acquired in real time at each training step, which is not limited by the embodiments of the present disclosure.

In an embodiment of the present disclosure, the second device may correspond to one or more network elements. In response to the second device being installed as a single board inside a network element device, the second device corresponds to only one network element, i.e., the network element where the single board is located; and in response to the second device being deployed independently as a separate device outside network elements, the second device may be connected to one or more network element devices, in which case the network element corresponding to the second device is the network element device connected to the second device, which may be one or more in number.

In an embodiment of the present disclosure, the second device may send a training step finished message (e.g., a training_step_finished message) to the first device, and the training step finished message carries the model parameter increment corresponding to the jth training step.

In another embodiment of the present disclosure, the method further includes: receiving, by the second device, a stop model training message (e.g., a delete_training_job message) sent by the first device. After the second device receives the stop model training message, the current process is finished and the model training is no longer performed.

In another embodiment of the present disclosure, the method further includes any one or both of:

uploading, by the second device, the number of the training data used in the jth training step to the first device;

uploading, by the second device, a loss function value corresponding to the jth training step to the first device.

In an embodiment of the present disclosure, the training step finished message further carries any one or more of the following: the number of training data used in the jth training step, the loss function value corresponding to the jth training step, and other contents specified in the model training code that need to be uploaded.

In an embodiment of the present disclosure, after the model training operation is delivered to the second device for distributed model training, the model training results of the second device are aggregated in the first device, so that the transmission of training data between the first device and the second device is avoided, which makes the method to be suitable for model training under multiple application scenarios (e.g., when the device manufacturer does not open data), and reduces the occupied bandwidth and reduces the difficulty of data security management, and at the same time, fully utilizes the parallel computing capability of multiple second devices to realize the scalability of the model training system.

In an embodiment of the present disclosure, as shown in FIG. 3, the training engine (TE) software and hardware apparatuses may be installed and deployed in the OSS and network elements respectively, and the OSS and multiple network elements may constitute a data-parallel distributed model training system to collaborate to complete model training.

The OSS is a system in the telecom network which is responsible for the operation and management of the telecom network. It consists of two levels of subsystems, where a network element management system (EMS) is responsible for management at the network element level and a network management system (NMS) is responsible for management at the network level across multiple network elements. A network element device in the telecom network usually consists of two subsystems, where an operation administration and maintenance (OAM) subsystem is responsible for the operation administration and maintenance of this network element, and a protocol stack subsystem is responsible for implementing the protocol stack function of the network element.

The first device may be a training engine deployed on the OSS, i.e., a centric training engine (CTE), which is mainly responsible for model training operation management, model training operation distribution, training step synchronization, model parameter aggregation and update, etc.; and the second device may be a training engine deployed on the network element, i.e., a distributed training engine (DTE), which is mainly responsible for training, using the local data of the network element, a model distributed by the CTE, and uploading the model parameter increment generated by each training step to the CTE.

The DTE may be installed as a single board inside a network element device, or may be deployed independently as a separate device outside network elements and connected to one or more network element devices. In order to speed up the process of model training, the DTE may contain dedicated computational acceleration hardware needed to accelerate model training, such as a graphics processing unit (GPU), a digital signal processing (DSP), a field-programmable gate array (FPGA), or application-specific integrated circuit (ASIC), as shown in FIG. 4.

For example, as shown in FIG. 4, the CTE includes three components: an operation manager, a DTE controller, and a training coordinator.

The operation manager is responsible for the life cycle management of multiple simulation training operation instances, allowing the CTE to execute multiple distributed model training operations in parallel.

The DTE controller is responsible for realizing the interaction between the CTE and the DTE in the model training process, including the selection of DTEs participating in the distributed model training, the delivering of a model training operation to the DTEs, the communication of each training step, such as the delivering of the model parameter of the CTE, and the collection of model parameter increments from the DTEs.

The training coordinator executes a first model training code so as to be responsible for controlling training steps, calculating a global model parameter increment, updating a global model parameter, and determining whether the model training is finished. The hardware of the CTE may be a generic server.

The DTE includes three components: a data collector, a data processor, and a model trainer.

The data collector is responsible for parsing a description of data required for model training in the model training operation and acquiring corresponding raw training data from the OAM subsystem of the network element according to the description of data required for model training.

The data processor provides a runtime library of data processing algorithms, executes a data processing code in the model training operation, and processes the raw training data into training samples required for model training.

The model trainer provides a runtime library of model training algorithms such as machine learning and deep learning, executes a second model training code, and uses the training samples to train a model to obtain the model parameter increment.

In an embodiment of the present disclosure, the network element may be any network element, such as a base station.

Several examples are given below to illustrate the implementation process of the above model training methods, and the examples are given only for convenience of illustration and are not intended to limit the scope of protection of embodiments of the present disclosure.

Example One

This example illustrates the model training method of an embodiment of the present disclosure by taking the training of a radio access network (RAN) coverage prediction model as an example.

Figure 5:
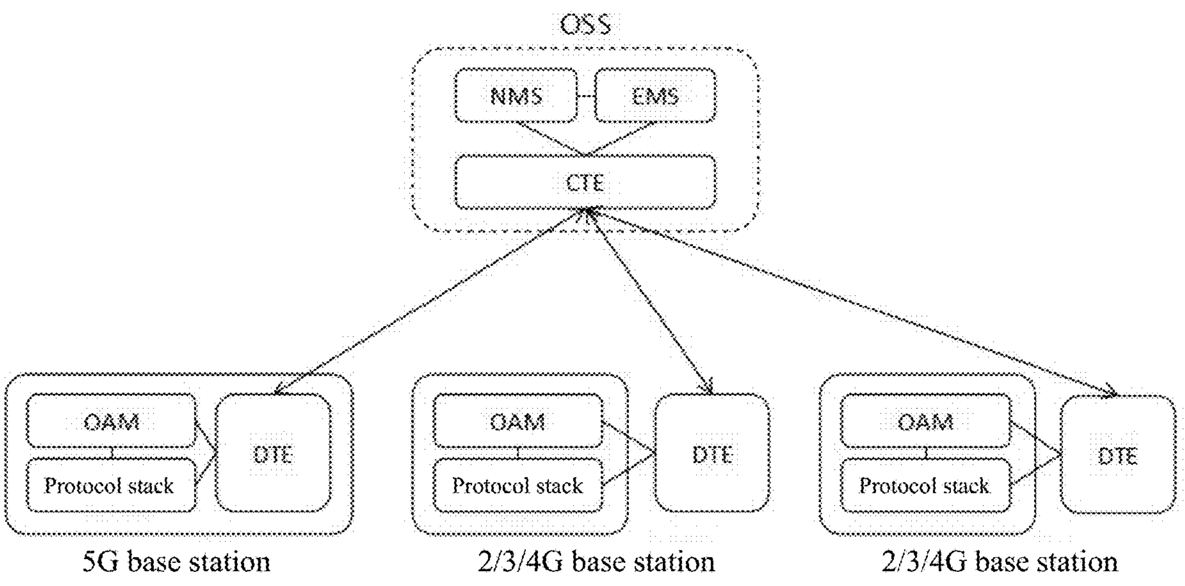
FIG. 5 is an architecture diagram of a model training system of example 1 and example 2 according to an embodiment of the present disclosure.

As shown in FIG. 5, a CTE is deployed at the OSS of the radio access network (RAN) and DTEs are deployed at the 2/3/4/5G base stations. Since 2/3/4G base stations are already present in large numbers in the existing network, the DTEs are deployed in an external way to avoid modification of the existing hardware. For the 5G base station, the DTE is deployed in a built-in manner.

In step A, the user deploys, on the CTE through the OSS, the model training operation to be performed.

The model training operation mainly includes:

1) a description of data required for model training that is in YAML language, including a list of cell identifiers (IDs), as well as cell configuration data, antenna configuration data, and measurement report data corresponding to each cell;
2) a data processing code, which may be written in python language, where the data processor of the DTE may execute the data processing code to complete data processing. The main function of the data processing code is to extract key features (as shown in Table 1) corresponding to each cell from the configuration data and measurement report data corresponding to each cell, and to generate training samples;

TABLE 1

| Feature | Description |
|---|---|
| Loss | The metric calculated from terminal measurement signals |
| Logdistance | The logarithm of the distance between the base station and the measurement point |
| Ant_azimuth | Antenna azimuth |
| Ant_pitchangle | Antenna pitch angle |
| Ant_high | Antenna height |
| Verticalangle | The angle between the line between the measurement point and the base station and the ground |
| Absrelanglegeo | The absolute value of the horizontal angle of the line between the measurement point and the base station |
| Ta | Time advance |
| Log_freg | The logarithm of the base station frequency |
| Log_ant_high | The logarithm of the antenna height |
| Loganthigh_multi_logdistance | The product of the logarithm of the antenna height and the logarithm of the distance |
| Rsrp | Field strength |

3) a first model training code and a second model training code, which may be written using the python-based SDK provided by the DTE. The training coordinator of the CTE may execute the first model training code to complete the update of the model parameter, and the model trainer of the DTE may execute the second model training code to complete the model training, and use dedicated hardware to accelerate the computation process of training. The main function of the second model training code is to build a multi-layer perceptron (MLP), which is a deep neural network model: its input is the features shown in Table 1 and its output is a predicted radio coverage field strength reference signal receiving power (RSRP) value; it takes the mean square error (MSE) as the target function; and it uses hyperparameters of the model training network (e.g., the maximum number of training steps, the training finishing strategy, etc.).

In step B, the CTE determines, according to the list of cell IDs included in the model training operation, DTEs participating in model training, i.e., all DTEs deployed in all base stations covered by all cells in the list of cell IDs, and delivers to the DTEs the description of data required for model training, the data processing code and the second model training code in the model training operation.

In step C, the DTE executes the data processing code to acquire from a base station corresponding to itself training data (i.e., the list of cell IDs, and the cell configuration data, the antenna configuration data, and the measurement report data corresponding to each cell) according to the description of data required for model training, and process the training data to obtain training samples.

In step D, the CTE executes a first model training code to, for a jth training step, deliver by the CTE a model parameter corresponding to the jth training step to the DTEs; the DTE receives the model parameter corresponding to the jth training step, executes the second model training code to perform model training according to the model parameter corresponding to the jth training step and the training samples to obtain a model parameter increment corresponding to the jth training step, and uploads the model parameter increment corresponding to the jth training step and the loss function value corresponding to the jth training step to the CTE; and the CTE calculates the average loss function value according to formula $$\bar{L}_j = \frac{1}{Z_j}\sum_i^N \#D_{ij}L_{ij}.$$

In response to the average loss function value not continuing to decrease in 20 consecutive training steps, the training is completed. The CTE uploads the model corresponding to the trained model parameter to a specified location in the OSS.

In step E, the OSS system acquires the trained RAN coverage prediction model, which may be used to subsequently predict the coverage of the radio network.

Example Two

This example illustrates the model training method of an embodiment of the present disclosure by taking the training of a RAN cell traffic prediction model as an example.

As shown in FIG. 5, a CTE is deployed at the OSS of the radio access network (RAN) and DTEs are deployed at the 2/3/4/5G base stations. Since 2/3/4G base stations are already present in large numbers in the existing network, the DTEs are deployed in an external way to avoid modification of the existing hardware. For the 5G base station, the DTE is deployed in a built-in manner.

In step A, the user deploys, on the CTE through the OSS system, the model training operation to be performed.

The model training operation mainly includes:

1) a description of data required for model training that is in YAML language, including a list of cell identifiers (IDs), and cell key performance indicator (KPI) data and data collection periods corresponding to each cell;
2) a data processing code, which may be written in python language, where the data processor of the DTE may execute the data processing code to complete data processing. The main function of the data processing code is to extract key features (as shown in Table 2) corresponding to each cell from the cell KPI data corresponding to each cell, and to generate training samples;

TABLE 2

| Feature | Description |
| --- | --- |
| CellID | Cell ID |
| Datetime | KPI time |
| Countrycode | Country code |
| Smsin | Number of short messages received |
| Smsout | Number of short messages sent |
| Calling | Number of incoming calls |
| Callout | Number of outgoing calls |
| Cdr | Number of data exchange requests |

3) a first model training code and a second model training code, which may be written using the python-based SDK provided by the DTE. The training coordinator of the CTE may execute the first model training code to complete the update of the model parameter, and the model trainer of the DTE may execute the second model training code to complete the model training, and use dedicated hardware to accelerate the computation process of training. The main function of the second model training code is to build a deep neural network model (Conv3DNet+LSTM); its inputs are the features shown in Table 2 and its output is the predicted number of cell user access request call detail reports (CDRs); it takes the MSE as the target function; and it uses hyperparameters of the training network (e.g., the maximum number of training steps, the training finishing strategy, etc.).

In step B, the CTE determines, according to the list of cell IDs included in the model training operation, DTEs participating in model training, i.e., all DTEs deployed in all base stations covered by all cells in the list of cell IDs, and delivers to the DTEs the description of data required for model training, the data processing code and the second model training code in the model training operation.

In step C, the DTE executes the data processing code to acquire from a base station corresponding to itself training data according to the description of data required for model training and process the training data to obtain training samples.

In step D, the CTE executes a first model training code to, for a jth training step, deliver by the CTE a model parameter corresponding to the jth training step to the DTEs; the DTE receives the model parameter corresponding to the jth training step, executes the second model training code to perform model training according to the model parameter corresponding to the jth training step and the training samples to obtain a model parameter increment corresponding to the jth training step, and uploads the model parameter increment corresponding to the jth training step and the loss function value corresponding to the jth training step to the CTE; and the CTE calculates the average loss function value according to formula $$\bar{L}_j = \frac{1}{Z_j}\sum_i^N \#D_{ij}L_{ij}.$$

In response to the average loss function value not continuing to decrease in 20 consecutive training steps, the training is completed. The CTE uploads the model corresponding to the trained model parameter to a specified location in the OSS.

In step E, the OSS system acquires the trained RAN cell traffic prediction model, which may be used to subsequently predict cell traffic (e.g., predict cell voice traffic).

Example Three

This example illustrates the model training method of an embodiment of the present disclosure by taking the training of a cable bearer network (BN) optical module fault prediction model as an example.

Figure 6:
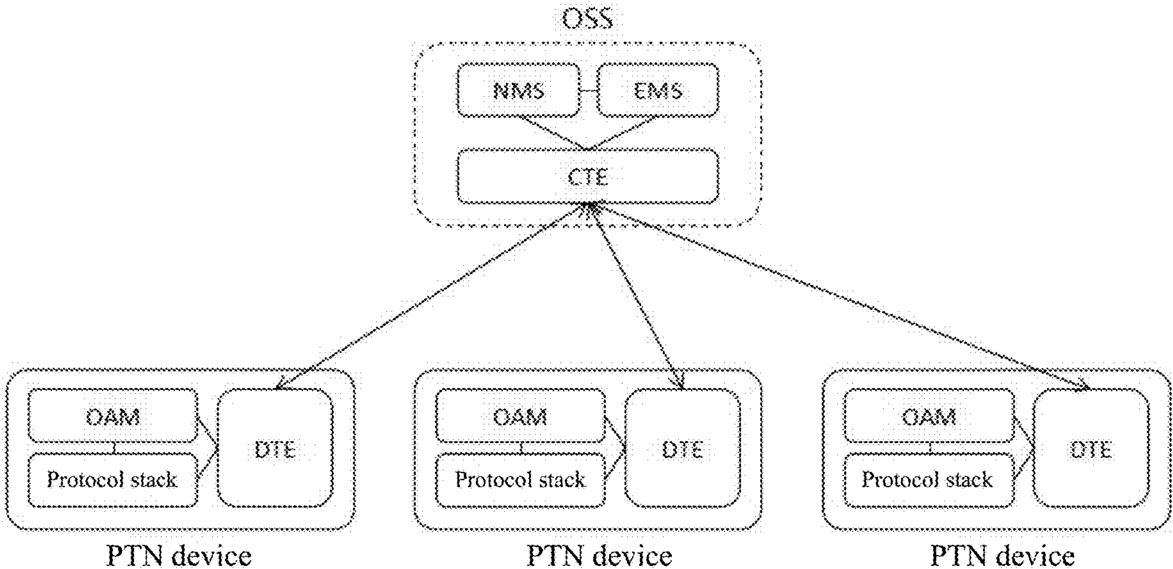
FIG. 6 is an architecture diagram of a model training system of example 3 according to an embodiment of the present disclosure.

As shown in FIG. 6, a CTE is deployed in the OSS of the cable bearer network (BN), and DTEs are deployed in PTN devices in a built-in manner.

In step A, the user deploys, on the CTE through the OSS, the model training operation to be performed.

The model training operation mainly includes:

1) a description of data required for training that is in YAML language, including the list of PTN device IDs, and optical module monitoring data, optical module alarm data, and data collection periods corresponding to each PTN device;
2) a data processing code, which may be written in python language, where the data processor of the DTE may execute the data processing code to complete data processing. The main function of the data processing code is to extract key features (as shown in Table 3) corresponding to each PTN device from the optical module monitoring data and optical module alarm data corresponding to each PTN device, and to generate training samples;

TABLE 3

| Feature | Description |
| --- | --- |
| Datetime | Collection time |
| Pn | Vendor reference number |
| Sn | Optical module serial number |
| Txpower | Transmit power |
| Biascurrent | Bias current |
| Temperature | Working temperature |
| Voltage | Voltage |
| Fault | Fault alarm or not |

3) a first model training code and a second model training code, which may be written using the python-based SDK provided by the DTE. The training coordinator of the CTE may execute the first model training code to complete the update of the model parameter, and the model trainer of the DTE may execute the second model training code to complete the model training, and use dedicated hardware to accelerate the computation process of training. The main function of the second model training code is to build a logistic regression model: its inputs are the features shown in Table 3 and its output is whether a fault occurs in the optical module (0—no fault, 1—fault); it takes the cross entropy as the target function; and it uses hyperparameters of the training network (e.g., the maximum number of training steps, the training finishing strategy, etc.).

In step B, the CTE determines, according to the list of PTN device IDs included in the model training operation, DTEs participating in model training, i.e., all DTEs deployed in all PTN devices in the list of PTN device IDs, delivers to the DTEs the description of the data required for model training, the data processing code and the second model training code in the model training operation.

In step C, the DTE executes the data processing code to acquire from a PTN device corresponding to itself training data according to the description of data required for model training and process the training data to obtain training samples.

In step D, the CTE executes a first model training code to, for a jth training step, deliver by the CTE a model parameter corresponding to the jth training step to the DTEs; the DTE receives the model parameter corresponding to the jth training step, executes the model training code to perform model training according to the model parameter corresponding to the jth training step and the training samples to obtain a model parameter increment corresponding to the jth training step, and uploads the model parameter increment corresponding to the jth training step and the loss function value corresponding to the jth training step to the CTE; and the CTE calculates the average loss function value according to formula $$\bar{L}_j = \frac{1}{Z_j}\sum_{i}^{N} \#D_{ij}L_{ij}.$$

In response to the average loss function value not continuing to decrease in 20 consecutive training steps, the training is completed. The CTE uploads the model corresponding to the trained model parameter to a specified location in the OSS.

In step E, the OSS system acquires the trained optical module fault prediction model which may be used to subsequently predict whether a fault occurs in the optical module.

Figure 10:
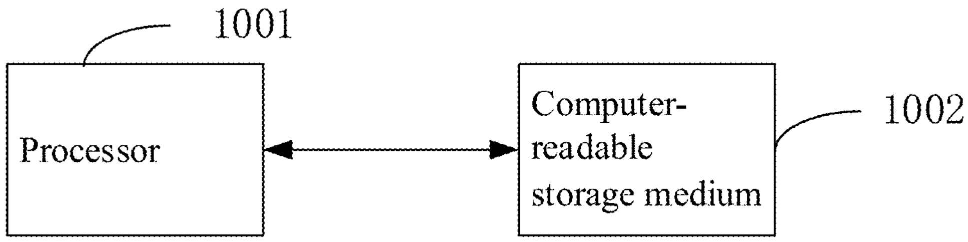
FIG. 10 is a schematic diagram of the structure of a model training apparatus according to another embodiment of the present disclosure.

With reference to FIG. 10, another embodiment of the present disclosure proposes a model training apparatus, including a processor 1001 and a non-transitory computer-readable storage medium 1002, where the non-transitory computer-readable storage medium stores instructions which, when executed by the processor, cause the processor to perform any one of the model training methods mentioned above.

Another embodiment of the present disclosure proposes a non-transitory computer-readable storage medium storing a computer program which, when executed by a processor, causes the processor to perform any one of the model training methods mentioned above.

Figure 7:
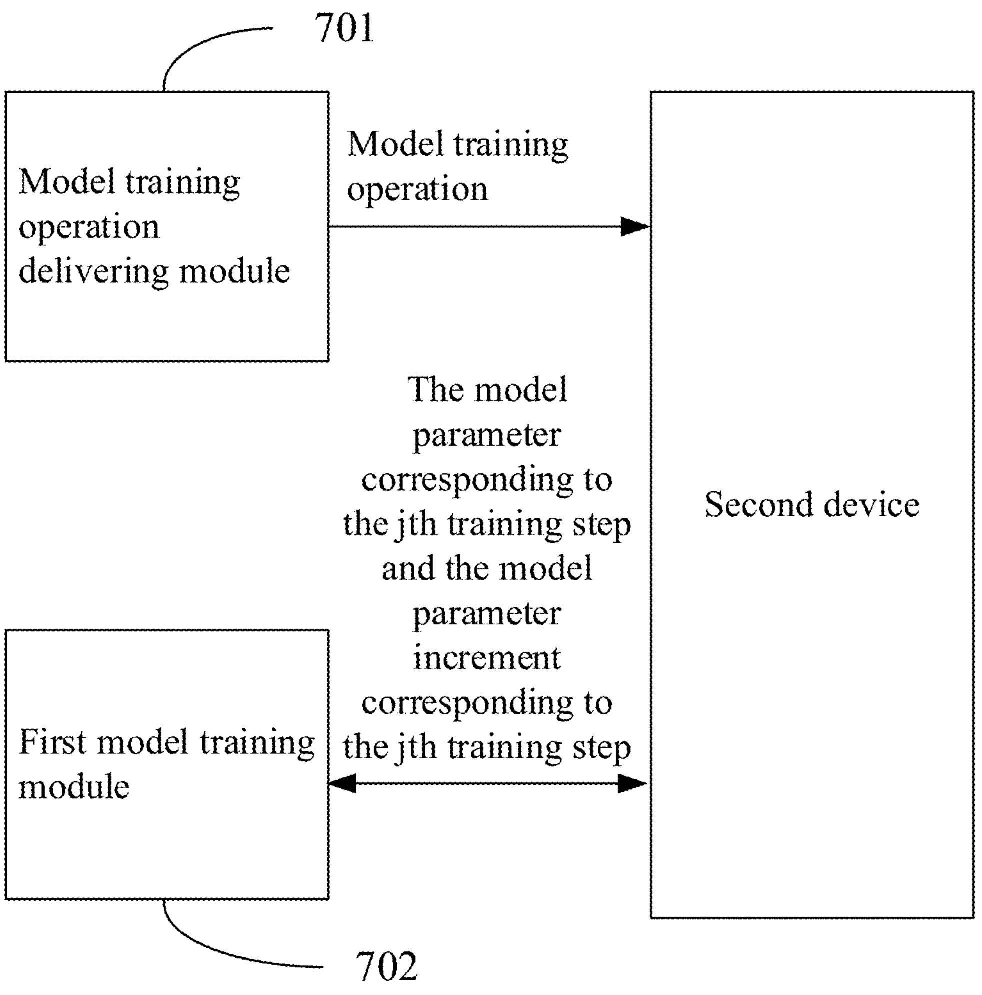
FIG. 7 is a schematic diagram of the structure of a model training apparatus according to another embodiment of the present disclosure.

With reference to FIG. 7, another embodiment of the present disclosure proposes a model training apparatus (such as the first device described above), including the following modules.

A model training operation delivering module 701 is configured to determine, according to a description of data required for model training in a model training operation, a second device participating in model training, and send a part of or the overall model training operation to the second device.

A first model training module 702 is configured to execute a first model training code in the model training operation to, for a jth training step, deliver by the first device a model parameter corresponding to the jth training step to the second device in response to the model training being not finished; and receive a model parameter increment corresponding to the jth training step uploaded by the second device, and calculate a model parameter corresponding to a (j+1)th training step according to the model parameter increment corresponding to the jth training step uploaded by the second device.

In an embodiment of the present disclosure, the first model training module 702 is further configured to: perform, in response to the model training being finished, any one or both of the following:

sending a stop model training message to the second device;

not delivering the model parameter corresponding to the jth training step to the second device.

In an embodiment of the present disclosure, the model training operation delivering module 701 is further configured to: receive a model training operation.

In an embodiment of the present disclosure, the model training operation includes: the description of data required for model training, a data processing code, the first model training code, and a second model training code.

In an embodiment of the present disclosure, the first model training module 702 is specifically configured to calculate the model parameter corresponding to the (j+1)th training step according to the model parameter increment corresponding to the jth training step uploaded by the second device in the following manner:

calculating a global model parameter increment corresponding to the jth training step according to the model parameter increment corresponding to the jth training step uploaded by the second device;

calculating the model parameter corresponding to the (j+1)th training step according to the global model parameter increment corresponding to the jth training step.

In an embodiment of the present disclosure, the first model training module 702 is further configured to: receive the number of training data used in the jth training step uploaded by the second device.

In an embodiment of the present disclosure, the first model training module 702 is specifically configured to calculate the global model parameter increment corresponding to the jth training step according to the model parameter increment corresponding to the jth training step uploaded by the second device in the following manner: calculating the global model parameter increment corresponding to the jth training step in accordance with formula $$\Delta\bar{W}_j = \frac{1}{Z_j}\sum_{i}^{N} \#D_{ij}\Delta W_{ij},$$

where $\Delta\bar{W}_j$ is the global model parameter increment corresponding to the jth training step, $$Z_j = \sum_{i}^{N} \#D_{ij},$$

$\#D_{ij}$ is the number of training data corresponding to the jth training step uploaded by an ith second device, N is the number of second devices participating in the model training, and $\Delta W_{ij}$ is the model parameter increment corresponding to the jth training step uploaded by the ith second device.

In an embodiment of the present disclosure, the first model training module 702 is specifically configured to calculate the model parameter corresponding to the (j+1)th training step according to the global model parameter increment corresponding to the jth training step in the following manner: calculating the model parameter corresponding to the (j+1)th training $W_{j+1}=W_j+\alpha\Delta\bar{W}_j$, where Wj+1 is the model parameter corresponding to the (j+1)th training step, Wj is the model parameter corresponding to the jth training step, $\alpha$ is a learning rate, and $\Delta\overline{W}_j$ is the global model parameter increment corresponding to the jth training step.

In an embodiment of the present disclosure, the first model training module 702 is specifically configured to determine whether the model training is finished in any one or both of the following manners:

in response to j being greater than or equal to a maximum number of training steps, determining that the model training is finished;

in response to j being less than the maximum number of training steps, determining that the model training is not finished.

In an embodiment of the present disclosure, the first model training module 702 is specifically configured to determine whether the model training is finished in any one or both of the following manners:

in response to a difference between average loss function values corresponding to any two adjacent training steps from a (j−m+1)th training step to the jth training step being less than or equal to a preset threshold, determining that the model training is finished;

in response to a difference between average loss function values corresponding to at least two adjacent training steps from the (j−m+1)th training step to the jth training step being greater than the preset threshold, determining that the model training is not finished.

In an embodiment of the present disclosure, the first model training module 702 is further configured to:

calculate an average loss function value corresponding to the jth training step in accordance with formula $$\overline{L}_j = \frac{1}{Z_j}\sum_i^N \#D_{ij}L_{ij},$$

where $\overline{L}_j$ is an average loss function value corresponding to the jth training step, $$Z_j = \sum_i^N \#D_{ij},$$

$\#D_{ij}$ is the number of training data corresponding to the jth training step uploaded by an ith second device, N is the number of second devices participating in the model training, and $L_{ij}$ is a loss function value corresponding to the jth training step uploaded by the ith device.

The specific implementation process of the above model training apparatus is the same as the specific implementation process of the model training method of the aforementioned embodiment, and will not be repeated here.

Figure 8:
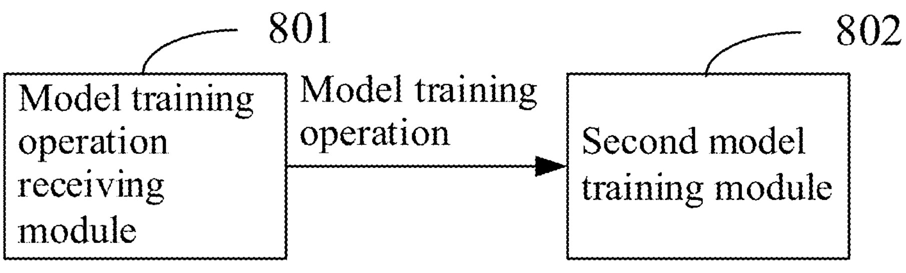
FIG. 8 is a schematic diagram of the structure of a model training apparatus according to another embodiment of the present disclosure.

With reference to FIG. 8, another embodiment of the present disclosure proposes a model training apparatus (such as the second device described above), including the following modules.

A model training operation receiving module 801 is configured to receive a part of or an overall model training operation sent by a first device.

A second model training module 802 is configured to, for a jth training step, receive a model parameter corresponding to a jth training step delivered by the first device, perform model training according to the model parameter corresponding to the jth training step and the part of or the overall model training operation to obtain a model parameter increment corresponding to the jth training step, and upload the model parameter increment corresponding to the jth training step to the first device.

In an embodiment of the present disclosure, the second model training module 802 is further configured to: receive a stop model training message sent by the first device.

In an embodiment of the present disclosure, the model training operation includes: a description of data required for model training, a data processing code, and a second model training code.

In an embodiment of the present disclosure, the second model training module 802 is specifically configured to perform the model training according to the model parameter corresponding to the jth training step and the part of or the overall model training operation to obtain the model parameter increment corresponding to the jth training step in the following manner: executing the data processing code to acquire from a network element corresponding to itself training data corresponding to the jth training step according to the description of data required for model training and process the training data corresponding to the jth training step to obtain training samples corresponding to the jth training step, and executing the second model training code to perform the model training according to the model parameter corresponding to the jth training step and the training samples corresponding to the jth training step to obtain the model parameter increment corresponding to the jth training step.

In an embodiment of the present disclosure, the second model training module 802 is further configured to: execute the data processing code to acquire from a network element corresponding to itself training data according to the description of data required for model training and process the training data to obtain training samples; and execute the second model training code to perform the model training according to the model parameter corresponding to the jth training step and the training samples to obtain the model parameter increment corresponding to the jth training step.

In an embodiment of the present disclosure, the second model training module 802 is further configured to perform any one or both of the following:

uploading the number of the training data used in the jth training step to the first device;

uploading a loss function value corresponding to the jth training step to the first device.

The specific implementation process of the above model training apparatus is the same as the specific implementation process of the model training method of the aforementioned embodiment, and will not be repeated here.

Figure 9:
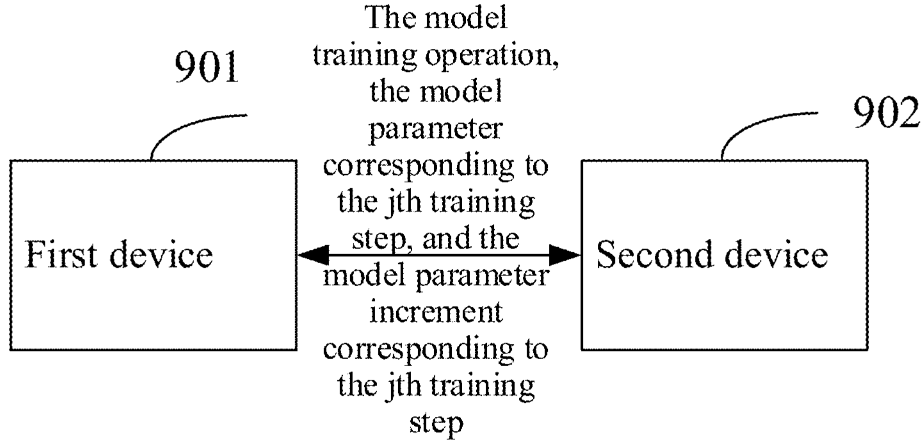
FIG. 9 is a schematic diagram of the structure of a model training system according to another embodiment of the present disclosure.

With reference to FIG. 9, another embodiment of the present disclosure proposes a model training system, including the following modules.

A first device 901 is configured to determine, according to a description of data required for model training in a model training operation, a second device participating in model training, and send a part of or the overall model training operation to the second device; execute a first model training code in the model training operation to, for a jth training step, deliver a model parameter corresponding to the jth training step to the second device in response to the model training being not finished; and receive a model parameter increment corresponding to the jth training step uploaded by the second device, and calculate a model parameter corresponding to a (j+1)th training step according to the model parameter increment corresponding to the jth training step uploaded by the second device.

A second device 902 is configured to receive the part of or the overall model training operation sent by the first device; and for a jth training step, receive the model parameter corresponding to the jth training step delivered by the first device, perform model training according to the model parameter corresponding to the jth training step and the part of or the overall model training operation to obtain a model parameter increment corresponding to the jth training step, and upload the model parameter increment corresponding to the jth training step to the first device.

In an embodiment of the present disclosure, the first device 901 is further configured to: perform, in response to the model training being finished, any one or both of the following:

sending a stop model training message to the second device;

not delivering the model parameter corresponding to the jth training step to the second device.

In an embodiment of the present disclosure, the second device 902 is further configured to: receive a stop model training message sent by the first device.

In an embodiment of the present disclosure, the first device 901 is further configured to: receive a model training operation.

In an embodiment of the present disclosure, the model training operation includes: the description of data required for model training, a data processing code, the first model training code, and a second model training code.

In an embodiment of the present disclosure, the first device 901 is specifically configured to calculate the model parameter corresponding to the (j+1)th training step according to the model parameter increment corresponding to the jth training step uploaded by the second device in the following manner:

calculating a global model parameter increment corresponding to the jth training step according to the model parameter increment corresponding to the jth training step uploaded by the second device;

calculating the model parameter corresponding to the (j+1)th training step according to the global model parameter increment corresponding to the jth training step.

In an embodiment of the present disclosure, the first device 901 is further configured to: receive the number of training data used in the jth training step uploaded by the second device.

In an embodiment of the present disclosure, the second device 902 is further configured to perform any one or both of the following:

uploading the number of the training data used in the jth training step to the first device;

uploading a loss function value corresponding to the jth training step to the first device.

$$\Delta \overline{W}_j = \frac{1}{Z_j} \sum_i^N \#D_{ij} \Delta W_{ij},$$

where $\Delta\overline{W}_j$ is the global model parameter $$Z_j = \sum_i^N \#D_{ij},$$

$\#D_{ij}$ is the number of training data corresponding to the jth training step uploaded by an ith second device, N is the number of second devices participating in the model training, and $\Delta W_{ij}$ is the model parameter increment corresponding to the jth training step uploaded by the ith second device.

In an embodiment of the present disclosure, the first device 901 is specifically configured to calculate the model parameter corresponding to the (j+1)th training step according to the global model parameter increment corresponding to the jth training step in the following manner: calculating the model parameter corresponding to the (j+1)th training step in accordance with formula $W_{j+1}=W_j+\alpha\Delta\overline{W}_j$, where Wj+1 is the model parameter corresponding to the (j+1)th training step, Wj is the model parameter corresponding to the jth training step, α is a learning rate, and $\Delta\overline{W}_j$ is the global model parameter increment corresponding to the jth training step.

In an embodiment of the present disclosure, the first device 901 is specifically configured to determine whether the model training is finished in any one or both of the following manners:

in response to j being greater than or equal to a maximum number of training steps, determining that the model training is finished;

in response to j being less than the maximum number of training steps, determining that the model training is not finished.

In an embodiment of the present disclosure, the first device 901 is specifically configured to determine whether the model training is finished in any one or both of the following manners:

in response to a difference between average loss function values corresponding to any two adjacent training steps from a (j−m+1)th training step to the jth training step being less than or equal to a preset threshold, determining that the model training is finished;

in response to a difference between average loss function values corresponding to at least two adjacent training steps from the (j−m+1)th training step to the jth training step being greater than the preset threshold, determining that the model training is not finished.

In an embodiment of the present disclosure, the first device 901 is further configured to: calculate an average loss function value corresponding to the jth training step in accordance with formula $$\overline{L}_j = \frac{1}{Z_j} \sum_i^N \#D_{ij} L_{ij} \overline{L}_j$$

to the jth training step, $$Z_j = \sum_i^N \#D_{ij},$$

$\#D_{ij}$ is the number of training data corresponding to the jth training step uploaded by an ith second device, N is the number of second devices participating in the model training, and $L_{ij}$ is a loss function value corresponding to the jth training step uploaded by the ith device.

In an embodiment of the present disclosure, the second device 902 is specifically configured to perform the model training according to the model parameter corresponding to the jth training step and the part of or the overall model training operation to obtain the model parameter increment corresponding to the jth training step in the following manner: executing the data processing code to acquire from a network element corresponding to itself training data corresponding to the jth training step according to the description of data required for model training and process the training data corresponding to the jth training step to obtain training samples corresponding to the jth training step, and executing the second model training code to perform the model training according to the model parameter corresponding to the jth training step and the training samples corresponding to the jth training step to obtain the model parameter increment corresponding to the jth training step.

In an embodiment of the present disclosure, the second device 902 is further configured to: execute the data processing code to acquire from a network element corresponding to itself training data according to the description of data required for model training and process the training data to obtain training samples; and execute the second model training code to perform the model training according to the model parameter corresponding to the jth training step and the training samples to obtain the model parameter increment corresponding to the jth training step.

The specific implementation process of the above model training system is the same as the specific implementation process of the model training method of the aforementioned embodiment, and will not be repeated here.

Another embodiment of the present disclosure provides a prediction method, including:

acquiring data required for prediction, and extracting a key feature from the data required for prediction;

inputting the key feature into a model corresponding to a trained model parameter in any one of the above model training methods, and outputting a predicted value.

Figure 11:
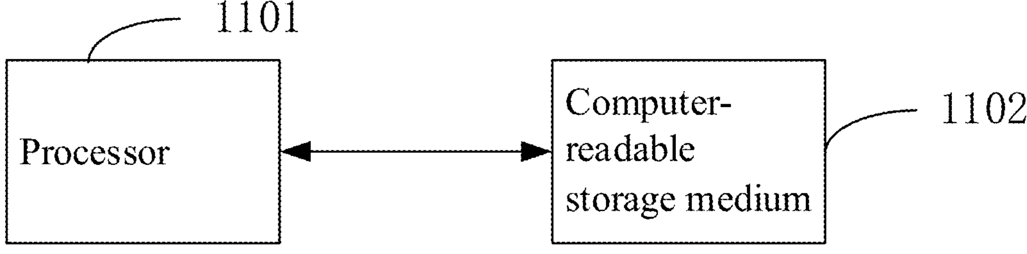
FIG. 11 is a schematic diagram of the structure of a prediction apparatus according to another embodiment of the present disclosure.

With reference to FIG. 11, another embodiment of the present disclosure provides a prediction apparatus including a processor 1101 and a non-transitory computer-readable storage medium 1102, where the non-transitory computer-readable storage medium stores instructions which, when executed by the processor 1101, cause the processor to perform any one of the above prediction methods.

Another embodiment of the present disclosure provides a non-transitory computer-readable storage medium storing a computer program which, when executed by a processor, causes the processor to perform any one of the above prediction methods.

Another embodiment of the present disclosure provides a prediction apparatus, including the following modules.

A data acquisition module is configured to acquire data required for prediction;

A key feature extraction module is configured to extract a key feature from the data required for prediction;

A prediction module is configured to input the key feature into a model corresponding to a trained model parameter in any one of the above model training methods, and output a predicted value.

Several examples are given below to illustrate the implementation process of the above prediction method, and the examples are given only for convenience of illustration and are not intended to limit the scope of protection of embodiments of the present disclosure.

Example Four

This example illustrates the prediction method of an embodiment of the present disclosure by taking the prediction of the coverage of a radio network based on the trained RAN coverage prediction model in Example 1 as an example, the method including the following steps.

In step A, the OSS system acquires data required for the prediction of the coverage of the radio network, the data including: a list of cell IDs, and cell configuration data, antenna configuration data, and measurement report data corresponding to each cell.

In step B, the OSS system extracts key features (as shown in Table 1) of each cell from the cell configuration data, antenna configuration data and measurement report data corresponding to each cell.

In step C, the OSS system inputs the key features corresponding to each cell into the trained RAN coverage prediction model in Example 1 and outputs the predicted value of the radio coverage field strength RSRP for each cell.

In step D, the OSS system displays to the user the predicted value of the radio coverage field strength RSRP of each cell.

Example Five

This example illustrates the prediction method of an embodiment of the present disclosure by taking the prediction of cell traffic (e.g., voice traffic) based on the trained RAN cell traffic prediction model in Example 2 as an example, the method including the following steps.

In step A, the OSS system acquires data required for cell traffic prediction, the data including: a list of cell IDs, and cell KPI data corresponding to each cell for the last 2 weeks.

In step B, the OSS system extracts key features (as shown in Table 2) corresponding to each cell from the cell KPI data corresponding to each cell.

In step C, the OSS system inputs the key features corresponding to each cell into the RAN cell traffic prediction model and outputs the predicted value of the traffic of each cell.

In step D, the OSS system displays to the user the predicted value of the traffic of each cell.

Example Six

This example illustrates the prediction method of an embodiment of the present disclosure by performing optical module fault prediction based on the trained cable BN optical module fault prediction model in Example 3, the method including the following steps.

In step A, the OSS system acquires data required for optical module fault prediction, the data including: a list of PTN device IDs, and optical module monitoring data, optical module alarm data, and data collection periods corresponding to each PTN device.

In step B, the OSS system extracts key features (as shown in Table 3) corresponding to each PTN device from the optical module monitoring data, optical module alarm data, and data collection periods corresponding to each PTN device.

In step C, the OSS system inputs the key features corresponding to each PTN device into the optical module fault prediction model and outputs the predicted value that indicates whether a fault occurs in the optical module corresponding to each PTN device.

In step D, the OSS system displays to the user the predicted value that indicates whether a fault occurs in the optical module corresponding to each PTN device.

An embodiment of the present disclosure includes: determining, by a first device according to a description of data required for model training in a model training operation, a second device participating in model training, and sending a part of or the overall model training operation to the second device; executing a first model training code in the model training operation to, for a jth training step, deliver by the first device a model parameter corresponding to the jth training step to the second device in response to the model training being not finished; and receive a model parameter increment corresponding to the jth training step uploaded by the second device, and calculate a model parameter corresponding to a (j+1)th training step according to the model parameter increment corresponding to the jth training step uploaded by the second device. In an embodiment of the present disclosure, after the model training operation is delivered to the second device for distributed model training, the model training results of the second device are aggregated in the first device, so that the transmission of training data between the first device and the second device is avoided, which makes the method to be suitable for model training under multiple application scenarios (e.g., when the device manufacturer does not open data), and reduces the occupied bandwidth and reduces the difficulty of data security management, and at the same time, fully utilizes the parallel computing capability of multiple second devices to realize the scalability of the model training system.

It can be understood by those having ordinary skills in the art that all or some of the steps of the methods, systems and functional modules/units in the apparatuses disclosed above can be implemented as software, firmware, hardware and appropriate combinations thereof. In the hardware implementation, the division between functional modules/units mentioned in the above description does not necessarily correspond to the division of physical components; for example, a physical component may have multiple functions, or a function or step may be performed cooperatively by several physical components. Some of all of the components may be implemented as software executed by a processor, such as a digital signal processor or a microprocessor, or as hardware, or as an integrated circuit, such as an application specific integrated circuit. Such software can be distributed on computer-readable media, which can include computer storage media (or non-transitory media) and communication media (or transitory media). As well known to those having ordinary skills in the art, the term computer storage medium includes volatile and nonvolatile, removable and non-removable media implemented in any method or technology for storing information, such as computer-readable instructions, data structures, program modules or other data. A computer storage medium includes, but is not limited to, RAM, ROM, EEPROM, flash memory or other memory technologies, CD-ROM, digital versatile disk (DVD) or other optical disk storage, cassettes, magnetic tapes, magnetic disk storage or other magnetic storage apparatuses, or any other medium that can be configured to store desired information and can be accessed by a computer. Furthermore, it is well known to those having ordinary skills in the art that communication media typically contain computer-readable instructions, data structures, program modules or other data in a modulated data signal such as a carrier wave or other transmission mechanism, and may include any information delivery media.

While the embodiments disclosed in the present disclosure are described above, these embodiments are only for facilitating understanding of the embodiments of the present disclosure and are not used for limiting the embodiments of the present disclosure. Those having ordinary skills in the art can make any modification and change in the implementations and details without departing from the principal and scope of the embodiments of the present disclosure, but the scope of protection of the embodiments of the present disclosure shall still be subject to the scope defined by the appended claims.

The invention claimed is:

1. A model training method, comprising:

determining, by a first device, according to a description of data required for model training in a model training operation, a second device participating in model training, and sending a part of or the overall model training operation to the second device; and executing, by the first device, a first model training code in the model training operation to, for a jth training step, deliver by the first device a model parameter corresponding to the jth training step to the second device in response to the model training being not finished; and receiving a model parameter increment corresponding to the jth training step uploaded by the second device, and calculating a model parameter corresponding to a (j+1)th training step according to the model parameter increment corresponding to the jth training step uploaded by the second device;

wherein determining whether the model training is finished comprises at least one of:

in response to a difference between average loss function values corresponding to any two adjacent training steps from a (j+m+1) th training step to the jth training step being less than or equal to a preset threshold, determining that the model training is finished; or in response to a difference between average loss function values corresponding to at least two adjacent training steps from the (j+m+1) th training step to the jth training step being greater than the preset threshold, determining that the model training is not finished;

wherein the first device is a centric training engine deployed on at an operation support system of a radio access network (RAN), and the second device is a distributed training engine deployed at a base station; or wherein the first device is a centric training engine deployed in an operation support system of a cable bearer network (BN), and the second device is a distributed training engine deployed in a Packet Transport Network (PTN) device.

2. The method of claim 1, wherein in response to the model training being finished, the method further comprises at least one of the following:

sending, by the first device, a stop model training message to the second device; or not delivering, by the first device, the model parameter corresponding to the jth training step to the second device.

3. The method of claim 1, wherein before determining, by the first device according to the description of data required for model training, the second device participating in the model training, the method further comprises: receiving, by the first device, the model training operation.

4. The method of claim 1, wherein the model training operation comprises: the description of data required for model training, a data processing code, the first model training code, and a second model training code.

5. The method of claim 1, wherein calculating the model parameter corresponding to the (j+1)th training step according to the model parameter increment corresponding to the jth training step uploaded by the second device comprises:

calculating a global model parameter increment corresponding to the jth training step according to the model parameter increment corresponding to the jth training step uploaded by the second device; and calculating the model parameter corresponding to the (j+1)th training step according to the global model parameter increment corresponding to the jth training step.

6. The method of claim 5, wherein before calculating the global model parameter increment corresponding to the jth training step according to the model parameter increment corresponding to the jth training step uploaded by the second device, the method further comprises:

receiving, by the first device, the number of training data used in the jth training step uploaded by the second device; and calculating the global model parameter increment corresponding to the jth training step according to the model parameter increment corresponding to the jth training step uploaded by the second device comprises:

calculating the global model parameter increment corresponding to the jth training step in accordance with formula $$\Delta\overline{W}_j = \frac{1}{Z_j}\sum_i^N \#D_{ij}\Delta W_{ij},$$

wherein $\Delta\overline{W}_j$ $$Z_j = \sum_i^N \#D_{ij},$$

$\#D_{ij}$ is the number of training data corresponding to the jth training step uploaded by an ith second device, N is a number of second devices participating in the model training, and $\Delta W_{ij}$ is the model parameter increment corresponding to the jth training step uploaded by the ith second device.

7. The method of claim 5, wherein calculating the model parameter corresponding to the (j+1)th training step according to the global model parameter increment corresponding to the jth training step comprises:

calculating the model parameter corresponding to the (j+1)th training step in accordance with formula $W_{j+1}=W_j+\alpha\Delta\overline{W}_j$, wherein Wj+1 is the model parameter corresponding to the (j+1)th training step, Wj is the model parameter corresponding to the jth training step, $\alpha$ is a learning rate, and $\Delta\overline{W}_j$ is the global model parameter increment corresponding to the jth training step.

8. The method of claim 1, wherein an average loss function value corresponding to the jth training step is calculated in accordance with formula $$\overline{L}_j = \frac{1}{Z_j}\sum_i^N \#D_{ij}L_{ij},$$

wherein $\overline{L}_j$ is an average loss function value corresponding to the jth training step, $$Z_j = \sum_i^N \#D_{ij},$$

$\#D_{ij}$ is the number of training data corresponding to the jth training step uploaded by an ith second device, N is the number of second devices participating in the model training, and $L_{ij}$ is a loss function value corresponding to the jth training step uploaded by the ith device.

9. A non-transitory computer-readable storage medium storing a computer program which, when executed by a processor, causes the processor to perform the model training method of claim 1.

10. A prediction method, comprising:

acquiring data required for prediction, and extracting a key feature from the data required for prediction; and inputting the key feature into a model corresponding to a trained model parameter in a model training method of claim 1, and outputting a predicted value.

11. A non-transitory computer-readable storage medium storing a computer program which, when executed by a processor, causes the processor to perform the prediction method of claim 10.

12. A model training method, comprising:

receiving, by a second device, a part of or an overall model training operation sent by a first device; and for a jth training step, receiving by the second device a model parameter corresponding to a jth training step delivered by the first device, performing model training according to the model parameter corresponding to the jth training step and the part of or the overall model training operation to obtain a model parameter increment corresponding to the jth training step, and uploading the model parameter increment corresponding to the jth training step to the first device;

wherein determining whether the model training is finished comprises at least one of in response to a difference between average loss function values corresponding to any two adjacent training steps from a (j−m+1) th training step to the jth training step being less than or equal to a preset threshold, determining that the model training is finished; or in response to a difference between average loss function values corresponding to at least two adjacent training steps from the (j−m+1) th training step to the jth training step being greater than the preset threshold, determining that the model training is not finished;

wherein the first device is a centric training engine deployed on at an operation support system of a radio access network (RAN), and the second device is a distributed training engine deployed at a base station; or wherein the first device is a centric training engine deployed in an operation support system of a cable bearer network (BN), and the second device is a distributed training engine deployed in a Packet Transport Network (PTN) device.

13. The method of claim 12, wherein the model training operation comprises: a description of data required for model training, a data processing code, a first model training code, and a second model training code; and performing the model training according to the model parameter corresponding to the jth training step and the part of or the overall model training operation to obtain the model parameter increment corresponding to the jth training step comprises:

executing the data processing code to acquire, from a network element corresponding to itself, training data corresponding to the jth training step according to the description of data required for model training and to process the training data corresponding to the jth training step to obtain training samples corresponding to the jth training step, and executing the second model training code to perform the model training according to the model parameter corresponding to the jth training step and the training samples corresponding to thejth training step to obtain the model parameter increment corresponding to the jth training step.

14. The method of claim 12, wherein the model training operation comprises: a description of data required for model training, a data processing code, a first model training code, and a second model training code; and after receiving, by the second device, the model training operation sent by the first device, the method further comprises:

executing the data processing code to acquire, from a network element corresponding to itself, training data according to the description of data required for model training, and to process the training data to obtain training samples; and performing the model training according to the model parameter corresponding to the jth training step and the part of or the overall model training operation to obtain the model parameter increment corresponding to the jth training step comprises:

executing the second model training code to perform the model training according to the model parameter corresponding to the jth training step and the training samples to obtain the model parameter increment corresponding to the jth training step.

15. The method of claim 13, further comprising at least one of:

uploading, by the second device, the number of the training data used in the jth training step to the first device; or uploading, by the second device, a loss function value corresponding to the jth training step to the first device.

16. A non-transitory computer-readable storage medium storing a computer program which, when executed by a processor, causes the processor to perform the model training method of claim 12.

17. A prediction method, comprising:

acquiring data required for prediction, and extracting a key feature from the data required for prediction; and inputting the key feature into a model corresponding to a trained model parameter in a model training method of claim 12, and outputting a predicted value.

18. A non-transitory computer-readable storage medium storing a computer program which, when executed by a processor, causes the processor to perform the prediction method of claim 17.

* * * * *